(12) United States Patent
Bai

(10) Patent No.: US 6,874,609 B2
(45) Date of Patent: Apr. 5, 2005

(54) ROTARY-TO-LINEAR TRANSFER DEVICE

(75) Inventor: Shushan Bai, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 158 days.

(21) Appl. No.: 10/303,245

(22) Filed: Nov. 25, 2002

(65) Prior Publication Data

US 2004/0099071 A1 May 27, 2004

(51) Int. Cl.$^7$ .............................................. F16D 19/00
(52) U.S. Cl. ................... 192/93 A; 192/84.6; 192/84.7
(58) Field of Search ............................ 192/93 A, 84.6, 192/84.7

(56) References Cited

U.S. PATENT DOCUMENTS

| | | | | |
|---|---|---|---|---|
| 4,895,236 A | * | 1/1990 | Sakakibara et al. | 192/84.6 |
| 5,516,333 A | * | 5/1996 | Benson | 474/19 |
| 5,915,514 A | * | 6/1999 | Nojiri et al. | 192/38 |
| 6,053,293 A | * | 4/2000 | Sato et al. | 192/35 |
| 6,557,677 B2 | * | 5/2003 | Peura | 192/3.56 |
| 2002/0063027 A1 | * | 5/2002 | Karambelas et al. | 192/35 |
| 2003/0094343 A1 | * | 5/2003 | Showalter | 192/35 |

* cited by examiner

Primary Examiner—David M. Fenstermacher
(74) Attorney, Agent, or Firm—Leslie C. Hodges

(57) ABSTRACT

A rotary-to-linear actuator includes two thrust plates. One of the thrust plates has three roller assemblies secured thereto. The roller assemblies are equiangularly spaced and disposed at separate radii. The other thrust plate has three ramps formed thereon in juxtaposed relation to respective ones of the roller assemblies. One of the thrust plates is rotatable relative to the other whereby the action between the roller assemblies and the ramps causes the rotary action of the one thrust plate to induce linear movement in the other thrust plate. The radially spaced roller assemblies and ramps permit substantially 360 degrees of rotation at the rotatable plate during linear movement of the other plate.

3 Claims, 3 Drawing Sheets

ROTARY-TO-LINEAR TRANSFER DEVICE

TECHNICAL FIELD

This invention relates to transfer type mechanisms and, more particularly, to transfer type mechanisms, which transfer rotary motion to linear motion.

BACKGROUND OF THE INVENTION

Rotary-to-linear transfer devices, also known as torque-to-thrust transfer devices, have a rotating input member and a linear moving output member. The roller members are disposed between the input member and the output member to permit the required relative rotation between these two units. The roller members are generally disposed in a group of three separated by 120 degrees and operate on an adjacent ramp, which is formed on the output member. The ramps and rollers are on the same radius. The rollers are dispersed at 120 degrees to provide for even distribution of force loads thus limiting the input motion to 120 degrees. This will limit the total linear travel especially when the ramp angle is chosen small enough to have a self-locking feature.

SUMMARY OF THE INVENTION

It is an object of the present invention to provide an improved rotary-to-linear transfer device.

In one aspect of the present invention, the rotary input member has three roller members equally spaced and disposed adjacent a complementary ramp on the output member.

In another aspect of the present invention, the roller members are disposed at different radial positions relative to the axis of the input member as are the ramps on the output member.

In yet another aspect of the present invention, the rotary input member can have approximately 360 degrees of input rotation all of which can be transferred linearly to the output member.

In a further aspect of the present invention, the linear motion of the output member is used to provide engagement and disengagement of a torque-transmitting mechanism.

DESCRIPTION OF THE EXEMPLARY EMBODIMENT

Figure 1:
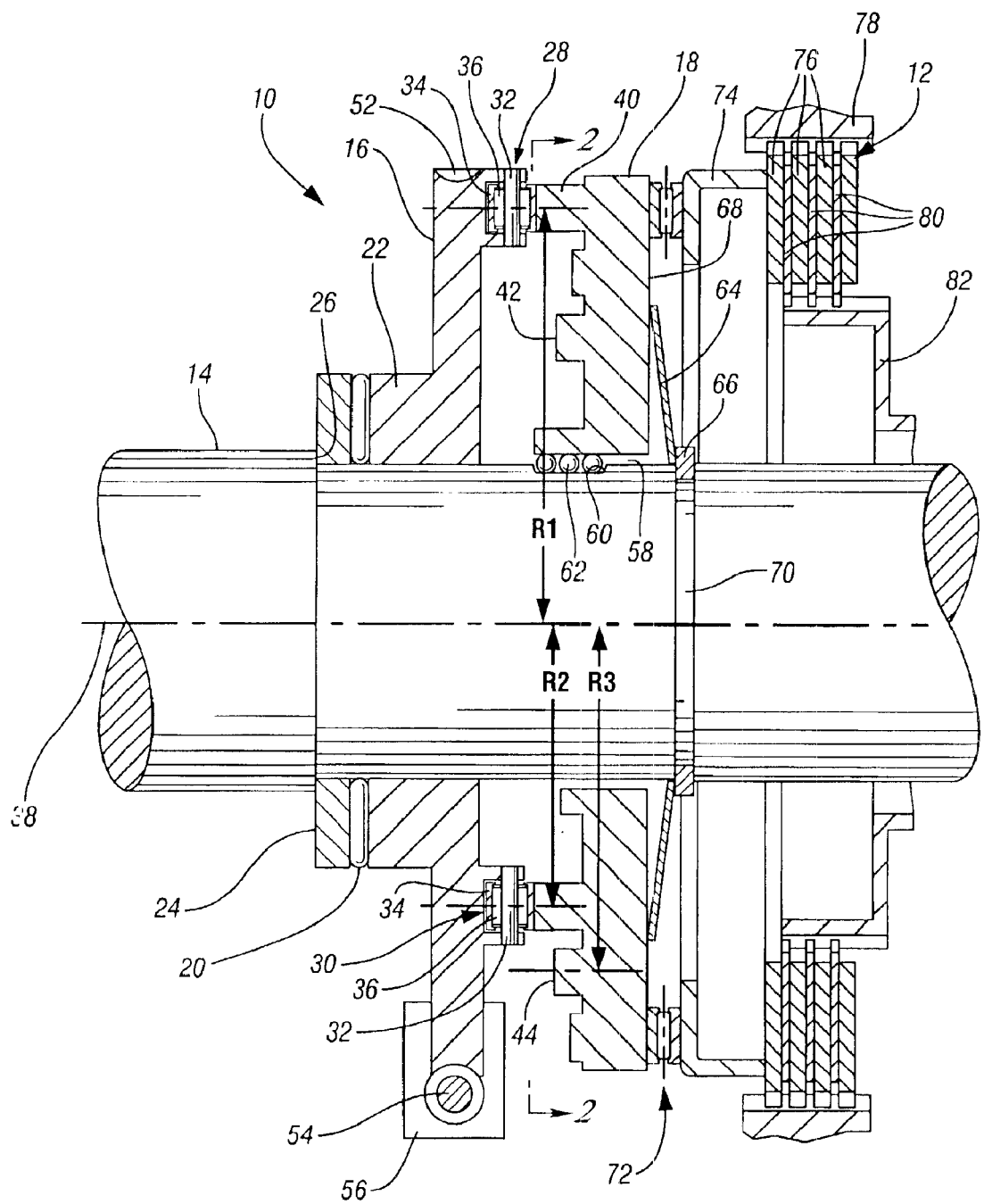
FIG. 1 is a cross-sectional elevational view of a rotary-to-linear transfer device operating on a torque-transmitting mechanism shown in the engaged condition.

Referring to the drawings, wherein like characters represent the same or corresponding parts throughout the several views, there is seen in FIG. 1 a rotary-to-linear transfer mechanism 10 and a torque-transmitting mechanism 12. The rotary-to-linear transfer mechanism 10 has a rotatable support shaft 14, a rotary thrust plate 16, and a linear thrust plate 18. The rotary thrust plate 16 is rotatably supported on the shaft 14. A thrust needle bearing 20 is disposed between a shoulder 22 on the plate 16 and a thrust support 24 abutting a shoulder 26 formed on the shaft 14.

The thrust plate 16 has mounted thereon three equiangularly displaced roller members 28 and 30. The third roller member is not shown in FIG. 1. Each roller member includes an axle or pin 32 on which a roller 34 is supported by a needle support bearing 36. The roller 28 is disposed at a radius R1 relative to centerline 38 of the shaft 14. The roller member 30 is disposed at a radius R2 relative to the centerline 38 and the third of the rollers is displaced at a radius R3 relative to the centerline 38.

Figure 2:
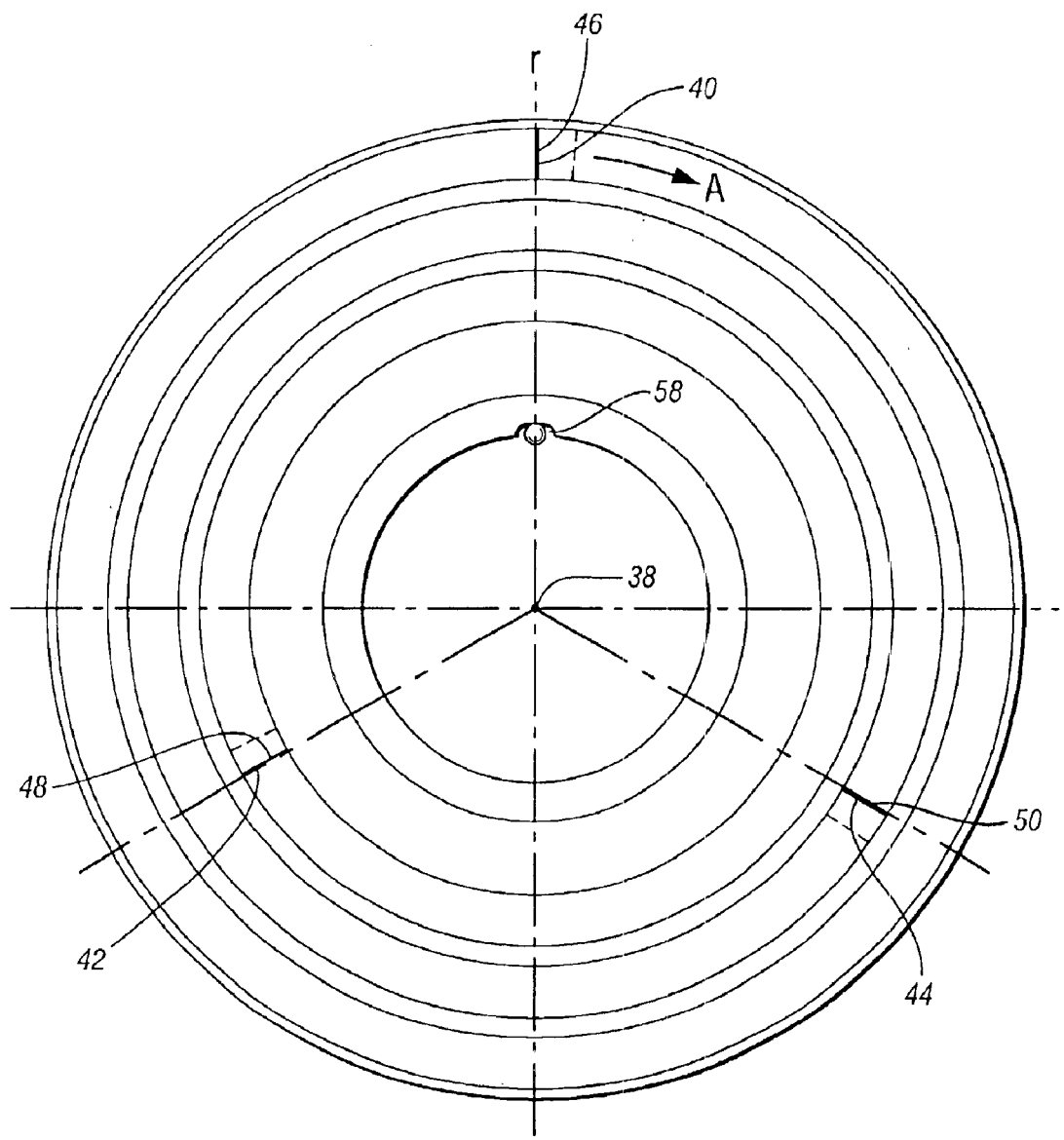
FIG. 2 is a view taken along line 2—2 of FIG. 1.

The linear thrust plate 18 includes three ramp portions 40, 42, and 44, which are disposed at the radii R1, R2, and R3, respectively. As seen in FIGS. 1 and 2, the ramp 40 has a high edge or end portion 46, the ramp 42 has a high edge or end portion 48, and the ramp 44 has a high edge or end portion 50. Each of the ramps 40, 42, and 44 begin at their respective high end portions 46, 48, and 50 and decrease in height in the direction of Arrow A. The roller 28, as seen in FIG. 1, is disposed at the high ramp end portion 46, the roller 30 is disposed at the high ramp end portion 48, and the unseen roller in FIG. 1 is disposed at the high end 50 of ramp 44.

The thrust plate 16 has a worm gear 52 formed on the outer periphery thereof. The worm gear 52 meshes with a worm 54, which is controlled in rotary motion by a conventional electric motor 56. The electric motor 56 is operable to rotate the worm 54 in both clockwise and counterclockwise directions such that the rotation of the thrust plate 16 can be readily controlled in both directions.

The thrust plate 18 has an inner recess portion 58, which cooperates with a notch 60 formed on the shaft 14 and a plurality of spheres or roller members 62 to permit relative linear motion between the thrust plate 18 and the support shaft 14 while preventing relative rotation therebetween. The thrust plate 18 is urged into contact with the rollers 28 and 30 of the thrust plate 16 by a Belleville spring 64, which is secured or trapped between a locking ring 66 and a surface 68 of the thrust plate 18. The locking ring 66 is secured in a groove 70 formed in the shaft 14.

A roller thrust bearing 72 abuts the surface 68 and also abuts an apply piston 74, which is a component of the torque-transmitting mechanism 12. The torque-transmitting mechanism 12 also includes a plurality of friction plates 76, which are splined to a housing member 78 and a plurality of friction plates 80, which are splined to a hub 82. The hub 82 can be connected with a conventional transmission member such as a gear or a shaft. If the housing 78 is a stationary housing, the hub 82 will be held stationary when the torque-transmitting mechanism 12 is in the fully engaged condition shown in FIG. 1.

Figure 3:
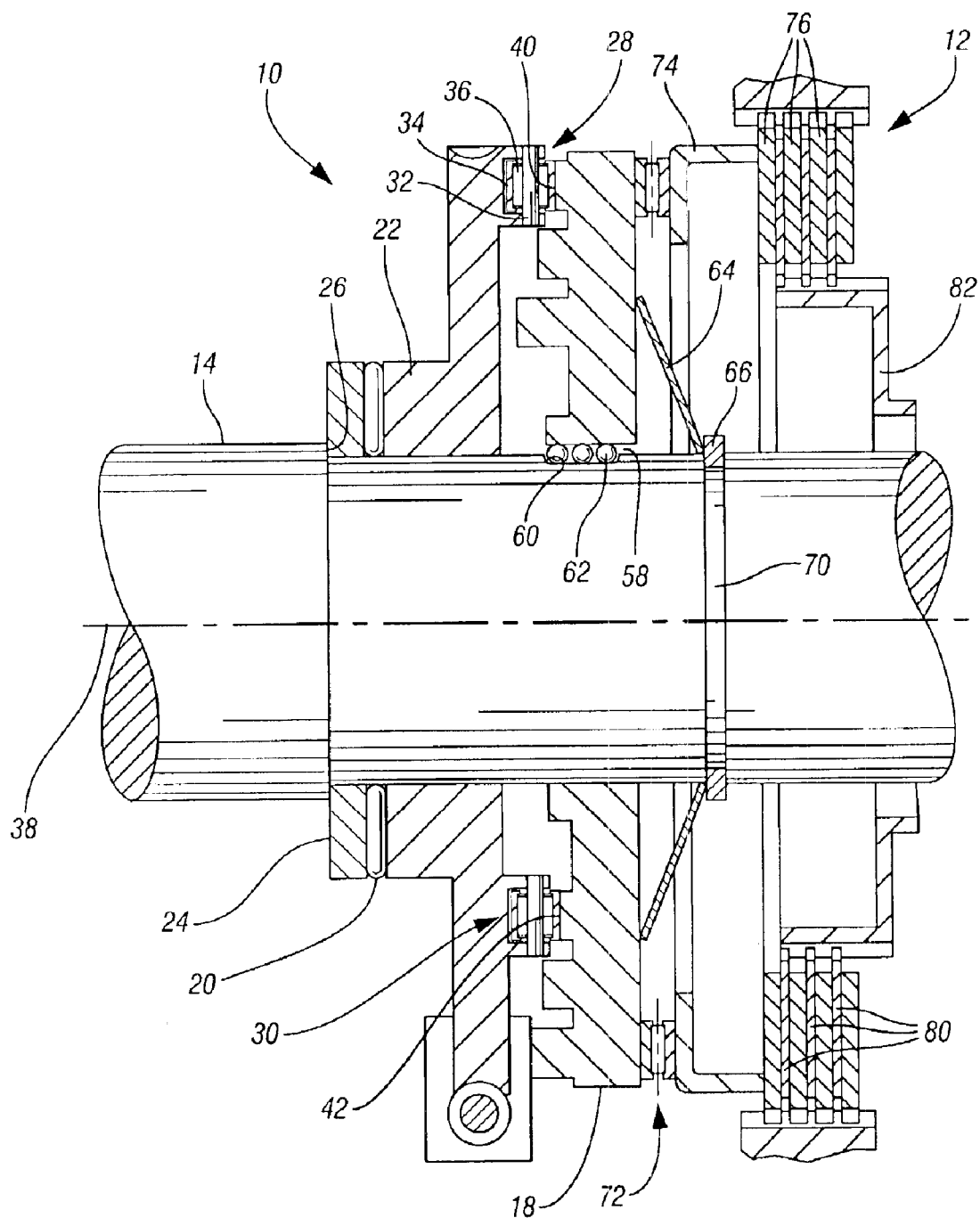
FIG. 3 is a view similar to FIG. 1 with the torque-transmitting mechanism shown in the fully disengaged condition.

The rotary-to-linear transfer device 10 and the torque-transmitting mechanism 12 are shown in the fully disengaged condition in FIG. 3. In this condition, the roller members 28 and 30 are at the low end of the ramps 40 and 42, respectively. These low ends are immediately adjacent the high ends 46 and 48. The third roller, which is not shown in FIG. 3, is also at the low end of its respective ramp 44 adjacent the high end 50.

When the plate 16 is rotated by the motor 56 and worm 54 in a counterclockwise direction, the roller members 28 and 30 will contact the respective thrust plate ramps 40 and 42 at continuously decreasing locations. This will permit the spring 64 to urge the thrust plate 18 leftward, as viewed in FIG. 3, thereby relieving the frictional engagement of the friction plates 76 and 80 of the torque-transmitting mechanism 12.

It will, at this point, be appreciated by those skilled in the art that the rotary thrust plate 16 can be driven through approximately 360 degrees while the thrust plate 18 is moving linearly a small amount sufficient to provide engagement and disengagement of the torque-transmitting mechanism 12. Such a high rotary input can provide a small thrust or linear output resulting in a small torque input providing a high thrust input.

When used in a torque-transmitting control mechanism, the electric motor replaces the more conventional hydraulic control system normally employed to enforce engagement of the piston 74 thereby alleviating the need for fluid passages and a fluid source, which improves the efficiency of the operation for a torque-transmitting mechanism.

The shaft 14 can also be used as the control input. If the thrust plate 16 is held stationary relative to the shaft 14 and the shaft 14 is rotated, the thrust plate 18 will rotate with the shaft 14 thereby causing the ramps 40, 42, and 44 to be rotated relative to the rollers 28 and 30, again inducing linear movement of the thrust plate 18 relative to the roller thrust plate 16. In this event, the drive motor can be connected with the shaft 14.

Those skilled in the art will recognize that other modifications and variations are possible in light of the above disclosure.

What is claimed is:

1. A rotary-to-linear transfer device comprising:

a first thrust plate having three roller assemblies secured thereto at equiangularly spaced locations and at separate and distinct radii;

a second thrust plate having three ramp portions formed thereon in complementary juxtaposed locations relative to said roller assemblies; and means for rotating one of said thrust plates to enforce a relative linear movement between said thrust plates.

2. The rotary to linear transfer device defined in claim 1 further comprising:

each of said ramp portions having a circumference extending substantially 360 degrees.

3. The rotary to linear transfer device defined in claim 1 further comprising:

each of said ramp portions having a starting point spaced substantially 120 degrees from each of the other ramp portion starting points.

* * * * *